(12) United States Patent
He (10) Patent No.: US 11,968,964 B1
(45) Date of Patent: Apr. 30, 2024

(54) SOLAR POWERED PET WATER DISPENSER (71) Applicant: MIAOMIAOHEI (SHENZHEN) CO., LTD., Zhongshan (CN)

(72) Inventor: Jiawen He, Guangdong (CN)

(73) Assignee: MIAOMIAOHEI (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 17/773,195

(22) PCT Filed: Jan. 27, 2022

(86) PCT No.: PCT/CN2022/074132
§ 371 (c)(1),
(2) Date: Apr. 29, 2022

(87) PCT Pub. No.: WO2023/133944
PCT Pub. Date: Jul. 20, 2023

(30) Foreign Application Priority Data

Jan. 11, 2022 (CN) .......................... 202210026070.9

(51) Int. Cl.
*A01K 7/02* (2006.01)
*A01K 7/00* (2006.01)

(52) U.S. Cl.
CPC .............. *A01K 7/022* (2013.01); *A01K 7/025* (2013.01); *A01K 7/027* (2013.01)

(58) Field of Classification Search
CPC .......... A01K 7/022; A01K 7/025; A01K 7/02; A01K 7/00; A01K 7/06
See application file for complete search history.

(56) References Cited

U.S. PATENT DOCUMENTS

| | | | |
|---|---|---|---|
| 10,165,753 B1* | 1/2019 | Huang | A01K 7/02 |
| 2010/0219196 A1* | 9/2010 | Alvino | A01K 7/00 119/72 |
| 2020/0100462 A1* | 4/2020 | Chen | A01K 7/025 |
| 2021/0144963 A1* | 5/2021 | Wang | C02F 1/42 |
| 2021/0144964 A1* | 5/2021 | Wang | B01D 39/1623 |
| 2022/0386563 A1* | 12/2022 | Wang | A01K 7/02 |
| 2023/0157259 A1* | 5/2023 | Xue | A01K 7/025 119/74 |
| 2023/0397573 A1* | 12/2023 | Zou | A01K 7/00 |
| 2024/0008449 A1* | 1/2024 | Geng | A01K 7/02 |

FOREIGN PATENT DOCUMENTS

WO  WO-2020022543 A1 *  1/2020 ............. A01K 7/022

* cited by examiner

*Primary Examiner* — Kristen C Hayes
(74) *Attorney, Agent, or Firm* — McClure, Qualey & Rodack, LLP (57) ABSTRACT

A solar pet water dispenser, comprising a solar cell assembly, a water storage assembly, a water pumping assembly, a temperature control assembly, a living body sensor, a first control assembly and an induction switch, wherein the water storage assembly is provided with a water storage tank and a water holding lid which are hinged connected with the water storage tank; the water pumping assembly is provided with a first water inlet and a first water outlet, the first water inlet is connected with the water storage cavity, the first water outlet is connected with the water storage lid; the living body sensor is arranged on the water storage tank; at an input end of the first control assembly is connected the solar cell assembly, at an output end thereof is connected the water pumping assembly and the temperature control assembly, and at a control end thereof the living body sensor.

20 Claims, 5 Drawing Sheets

SOLAR POWERED PET WATER DISPENSER

TECHNICAL FIELD

The present invention relates to the technical field of pet water dispensers, especially to a solar powered pet water dispenser.

BACKGROUND TECHNOLOGY

With rapid development of the society and increasingly abundant life of people, pets have become indispensable partners in people's daily life. When being fed too cold water especially in winter, pets are liable to suffer from gastrointestinal disorders, causing dyspepsia, diarrhea and other adverse reactions. However, pet drinking water apparatuses in the prior art serve only for the purpose of water storage, and cannot sterilize and heat drinking water for pets. As a result, in cold weather conditions, it is not recommendable to feed pets cool water directly; nevertheless, when drinking hot water, pets may easily get scalded and their health is on risk.

Solar energy is an inexhaustible and inexhaustible energy source, however it has not been used in the technical field of pet water dispensers yet.

SUMMARY OF THE INVENTION

The present invention aims to provide a solar powered pet water dispenser which can offer flowing water of a constant temperature for pets, so that pets' health is promised, and application of the solar power technology in pet water dispensers is realized, thereby achieving effects of both energy conservation and emission reduction.

The present invention is implemented by following technical solutions:

Disclosed is a solar powered pet water dispenser, comprising a solar cell assembly, a water storage assembly, a water pumping assembly, a temperature control assembly, a living body sensor, a first control assembly, and an induction switch, wherein the water storage assembly is provided with a water storage tank and a water holding lid which are in a hinged connection, and inside the water storage tank is provided a water storage cavity; the water pumping assembly is provided with a first water inlet and a first water outlet, the first water inlet is connected with the water storage cavity, and the first water outlet is connected with the water holding lid; the temperature control assembly is provided inside the water storage cavity; the living body sensor is arranged on an outer wall of the water storage tank; at an input end of the first control assembly is connected the solar cell assembly, at an output end of the first control assembly is respectively connected the water pumping assembly and the temperature control assembly, and at a control end of the first control assembly is connected the living body sensor; and an end of the induction switch is connected with an output end of the first control assembly, and another end of the induction switch is connected with the water pumping assembly; and wherein during operation, the solar cell assembly provides electrical energy to the temperature control assembly through the first control assembly, and the temperature control assembly starts working, the living body sensor acquires states of living bodies around the water storage tank to generate living body sensing signals, and the living body sensor loads the living body sensing signals into the first control assembly, the first control assembly generates a control command according to the living body sensing signals and loads the control command into the induction switch which then switches into a working state according to the control command, and the water pumping assembly switches into a working state according to the working state of the induction switch, and when the water pumping assembly enters a working state, water in the water storage cavity is drawn out to the water holding lid through the first water inlet and the first water outlet in sequence.

As a further improvement on the present invention, the first control assembly is further provided a wireless charging module, a USB power supply module and an energy storage battery, an input end of the wireless charging module is respectively connected with output ends of both the solar cell assembly and the energy storage battery, an input end of the energy storage battery is respectively connected with the solar cell assembly and the USB power supply module, and an output end of the wireless charging module is connected with the temperature control assembly, and is also connected with the water pumping assembly through the induction switch.

As a further improvement on the present invention, the solar powered pet water dispenser further comprises a second control assembly, wherein the first control assembly is further provided with a WiFi module, and the second control assembly communicates with the WiFi module; and the second control assembly respectively controls and connects to the water pumping assembly, the temperature control assembly and the induction switch through the first control assembly.

As a further improvement on the present invention, the solar powered pet water dispenser further comprises a weighing assembly arranged inside an inner wall of the water storage tank and communicating with the first control assembly, and a reminding assembly communicating with the first control assembly, wherein the first control assembly presets a default weight value and a water-added weight value, during operation, the weighing assembly obtains a to-be-measured weight value of water in the water storage cavity, the first control assembly generates a first water addition signal according to the default weight value and to-be-measured weight value, the reminding assembly acquires the first water addition signal, the reminding assembly reminds a user whether to add water or not according to the first water addition signal, and the first control assembly generates a second water addition signal according to the water addition weight value and the to-be-measured weight value, the reminding assembly acquires the second water addition signal, the reminding assembly reminds the user whether to stop adding water according to the second water addition signal, and the first control assembly is communicatively connected to the temperature control assembly to acquire a water evaporation amount in the water storage cavity, the first control assembly communicates with the living body sensor to obtain operation times of the water pumping assembly, and the first control assembly obtains water consumption of pets according to the water added value, the water evaporation amount and the operation times of the water pumping assembly.

As a further improvement on the present invention, the solar powered pet water dispenser further comprises a liquid level sensor arranged on a cavity wall of the water storage cavity and communicatively connected to the first control assembly, and a reminding assembly communicatively connected to the first control assembly, wherein the first control assembly presets a default weight value and a water-added level value, during operation, the liquid level sensor obtains a to-be-measured water level in the water storage cavity, the first control assembly generates a first water addition signal according to the default water level value and the to-be-measured water level value, and the reminding assembly obtains the first water addition signal, the reminding assembly reminds the user whether to add water or not according to the first addition signal, and the first control assembly generates a second water addition signal according to the water addition level value and the to-be-measured water level, the reminding assembly acquires the second water addition signal, and the reminding assembly reminds the user whether to stop adding water according to the second water addition signal, and the first control assembly communicates with the temperature control assembly to obtain a water evaporation amount in the water storage cavity, and the first control assembly is communicatively connected to the living body sensor to obtain operation times of the water pumping assembly, and the first control assembly obtains water consumption of pets according to the water level value, the water evaporation amount and the operation times of the water pumping assembly.

As a further improvement on the present invention, the solar powered pet water dispenser further comprises a flow sensor arranged inside the first water outlet, and a flow control valve arranged inside the first water outlet, wherein the flow control valve is communicatively connected with the flow sensor through the first control assembly.

As a further improvement on the present invention, on a top portion of the water holding lid is provided a water holding tank, at a bottom portion of the water holding lid is provided a first filtering tank, and the water holding lid is also provided with a second water inlet and a second water outlet, and the water holding tank is connected to the first water outlet through the second water inlet, and the water holding tank is connected to a first end of the first filtering tank through the second water outlet, and a second end of the first filtering tank is connected with the water storage cavity, wherein the first filtering tank is used for storing one or more filtering parts.

As a further improvement on the present invention, the solar powered pet water dispenser further comprises a second filtering tank arranged on a cavity wall of the water storage cavity, a first end of the second filtering tank is connected to a second end of the first filtering tank, a second end of the second filtering tank is connected to the water storage cavity, wherein the second filtering tank is used for storing parts, and filtering levels of the one or more filtering parts stored in the first filtering tank are greater than filtering levels of the one or more filtering parts stored in the second filtering tank.

As a further improvement on the present invention, the water pumping assembly is further provided with a third filtering tank, a first end of the third filtering tank is connected to the water storage cavity and a second end of the third filtering tank is connected to the first water inlet; and the third filtering tank is used for storing the one or more filtering parts.

As a further improvement on the present invention, the solar powered pet water dispenser further comprises a sterilization assembly arranged inside the water storage cavity.

Compared to the prior art, the solar powered pet water dispenser of the present invention has following beneficial effects:

the solar powered pet water dispenser is provided with a solar cell assembly, a water storage assembly, a water pumping assembly, a temperature control assembly, a living body sensor, a first control assembly, and an induction switch, 1. wherein an input end of the first control assembly is connected to the solar cell assembly and an output end of the first control assembly is respectively connected to the water pumping assembly and the temperature control assembly, so as to realize conversion of solar energy into electrical energy, and provide electrical energy to the water pumping assembly and the temperature control assembly, thereby achieving effects of energy saving and emission reduction;
2. wherein the temperature control assembly is arranged inside a water storage cavity, the water pumping assembly is provided with a first water inlet and a first water outlet, the first water inlet is connected to the water storage cavity, and the first water outlet is connected to a water holding lid, so that the temperature control assembly can deliver water of a suitable and constant temperature into the water holding lid, thereby avoiding health problems of pets caused by too cold or too hot drinking water, and the water pumping assembly can deliver flowing water into the water holding lid so as to reduce growth of bacteria and further protect pets' health; and
3. wherein the living body sensor is arranged on an outer wall of the water storage tank, a control end of the first control assembly is connected to the living body sensor, an end of the induction switch is connected to the output end of the first control assembly, another end of induction switch is connected to the water pumping assembly, so that the induction switch switches into a working state according to a living body sensing signal generated by the living body sensor, and then controls a working state of the water pumping assembly, and the water pumping assembly enters a working state when a pet gets closer, thereby reducing unnecessary power losses, and further realizing effects of energy saving and emission reduction.

BRIEF DESCRIPTION OF THE DRAWINGS

Embodiments of the present invention will be described in combination with accompanying drawings. The drawings attached to the present invention are intended to describe embodiments only for display purposes. Without deviating from principles of the present invention, those skilled in the art can easily make other embodiments following the steps described below.

The markups in the present invention are indicated as follows:

100—solar cell assembly;
200—water storage assembly;
210—water storage tank;

211—water storage cavity;
212—second filtering tank;
220—water holding lid;
221—water holding tank;
222—first filtering tank;
223—second water inlet;
224—second water outlet;
300—water pumping assembly;
310—first water inlet;
320—first water outlet;
330—third filtering tank;
400—temperature control assembly
500—living body sensor;
600—first control assembly
700—weighing assembly; and
800—sterilization assembly.

Specific Embodiments

The following is a clear and complete description of the technical solutions in embodiments of the present invention in combination with the attached drawings. It shall be understood that the embodiments described herein are intended only to explain and not to define the present invention. In addition, it should be noted that, for the convenience of description, the drawings only show some but not all structures related to the present invention. Based on the embodiments in the present invention, all other embodiments obtained by those of ordinary skill in the art without creative efforts shall fall within the protection scope of the present invention.

Terms like "first", "second", etc., in the present invention are used to distinguish different objects, rather than to describe a specific order. Furthermore, other terms such as "comprising" and "having" and any variations thereof, are intended to be non-exclusive inclusion. For example, a process, a method, a system, a product or a device comprising a series of steps or units are not limited to the mentioned steps or units, but optionally includes steps or units not listed, or optionally includes other steps or units inherent to the process, the method, the product or the device.

Reference to "embodiments" in the present invention means that particular features, structures or features described in conjunction with embodiments may be included in at least one of embodiments of the present invention. Phrases appeared at various parts of the specification do not necessarily refer to the same embodiment, nor are independent or alternative embodiments mutually exclusive with other embodiments. It is explicitly and implicitly understood by those skilled in the art that the embodiments described herein may be combined with other embodiments.

Please refer to FIGS. 1-7, the present embodiment offers a solar powered pet water dispenser comprising: a solar cell assembly 100, a water storage assembly 200, a water pumping assembly 300, a temperature control assembly 400, a living body sensor 500, a first control assembly 600, and an induction switch; the water storage assembly 200 is provided with a water storage tank 210 and a water holding lid 220 which are in a hinged connection, and inside the water storage tank 210 is provided a water storage cavity 211; the water pumping assembly 300 is provided with a first water inlet 310 and a first water outlet 320, the first water inlet 310 is connected with the water storage cavity 211, the first water outlet 320 is connected with the water holding lid 220; a temperature control assembly 400 is provided inside the water storage cavity 211; a living body sensor 500 is arranged on an outer wall of the water storage tank 210; at an input end of the first control assembly 600 is connected the solar cell assembly 100, at an output end of the first control assembly 600 is respectively connected the water pumping assembly 300 and the temperature control assembly 400, and at a control end of the first control assembly 600 is connected the living body sensor 500; and an end of the induction switch is connected with an output end of the first control assembly 600 and another end thereof is connected with the water pumping assembly 300. During operation, the solar cell assembly 100 provides electrical energy to the temperature control assembly 400 through the first control assembly 600, and the temperature control assembly 400 enters a working state, the living body sensor 500 acquires states of living bodies around the water storage tank 210 to generate living body sensing signals, and the living body sensor 500 loads the living body sensing signals into the first control assembly 600, the first control assembly 600 generates a control command according to the living body sensing signals and loads the control command into the induction switch which then switches into a working state according to the control command, and the water pumping assembly 300 switches into a working state according to the working state of the induction switch; when the water pumping assembly 300 enters a working state, the water in the water storage cavity 211 is drawn out to the water holding lid 220 through the first water inlet 310 and the first water outlet 320 in sequence.

Further, the solar cell assembly 100 is wound around an outer wall of the water storage tank 210 so as to increase a solar receiving area of the solar cell assembly 100 and improve a conversion amount of electric energy, thereby ensuring normal operation of the solar powered pet water dispenser.

Specifically, when water is injected into the water storage cavity 211 of the water storage tank 210 and the solar powered pet water dispenser enters into a working state, the solar cell assembly 100 receives solar energy and converts the solar energy into electric energy, the electric energy is controlled and managed by the first control assembly 600, and the electric energy is loaded into the temperature control assembly 400, and the temperature control assembly 400 enters a working state, and the water in the water storage cavity 211 is heated under an action of the temperature control assembly 400, the first control assembly 600 controls a heating temperature of the temperature control assembly 400, so as to determine a constant temperature value of the water in the water storage cavity 211, when a pet gets close to the solar powered pet water dispenser, the living body sensor 500 generates a first living body sensing signal, the first control assembly 600 loads the first living body sensing signal and processes the first living body sensing signal into a first control command, the induction switch loads the first control command and enters into a working state so that the water pumping assembly 300 successfully connects to the output end of the first control assembly 600, i.e. the water pumping assembly 300 successfully connects to the solar cell assembly 100, and the water pumping assembly 300 enters a working state and flowing water is delivered into the water holding lid 220; when the pet gets far away from the solar powered pet water dispenser, the living body sensor 500 generates a second living body sensing signal, the first control assembly 600 loads and processes the second living body sensing signal into a second control command, the induction switch loads the second control command and enters into a reset state so that the water pumping assembly 300 is disconnected from the first control assembly 600, i.e. the water pumping assembly 300 is disconnected from the solar cell assembly 100, and the water pumping assembly 300 enters into a reset state and stops delivering water into the water holding lid 220.

Specifically, the input end of the first control assembly 600 is connected to the solar cell assembly 100, the output end of the first control assembly 600 is respectively connected to the water pumping assembly 300 and the temperature control assembly 400 so as to convert solar energy into electric energy, and the electric energy is supplied to the water pumping assembly 300 and the temperature control assembly 400, thereby achieving effects of energy saving and emission reduction; the temperature control assembly 400 is arranged inside the water storage cavity 211, the water pumping assembly 300 is provided with a first water inlet 310 and a first water outlet 320, the first water inlet 310 is connected to the water storage cavity 211, the first water outlet 320 is connected to the water holding lid 220, and through the temperature control 400, water of a suitable and constant temperature is delivered into the water holding lid 220 so as to avoid that pets get gastrointestinal disorders, causing dyspepsia, diarrhea and other adverse reactions when being fed too cold water or changing temperature of water frequently, or pets get scalded when drinking too hot water; the water pumping assembly 300 delivers flowing water into the water holding lid 220 so as to reduce breeding of bacteria, and further protect health of pets; the living body sensor 500 is arranged on an outer wall of the water storage tank 210, a control end of the first control assembly 600 is connected to the living body sensor 500, an end of the induction switch is connected to output end of the first control assembly 600, another end of the induction switch is connected to the water pumping assembly 300 so that the induction switch switches into a working state according to a living body sensing signal generated by the living body sensor 500, and then controls a working state of the water pumping assembly 300, and the pumping water assembly 300 enters a working state when the pet gets close, thus reducing unnecessary power losses and further realizing energy saving and emission reduction.

Figure 6:
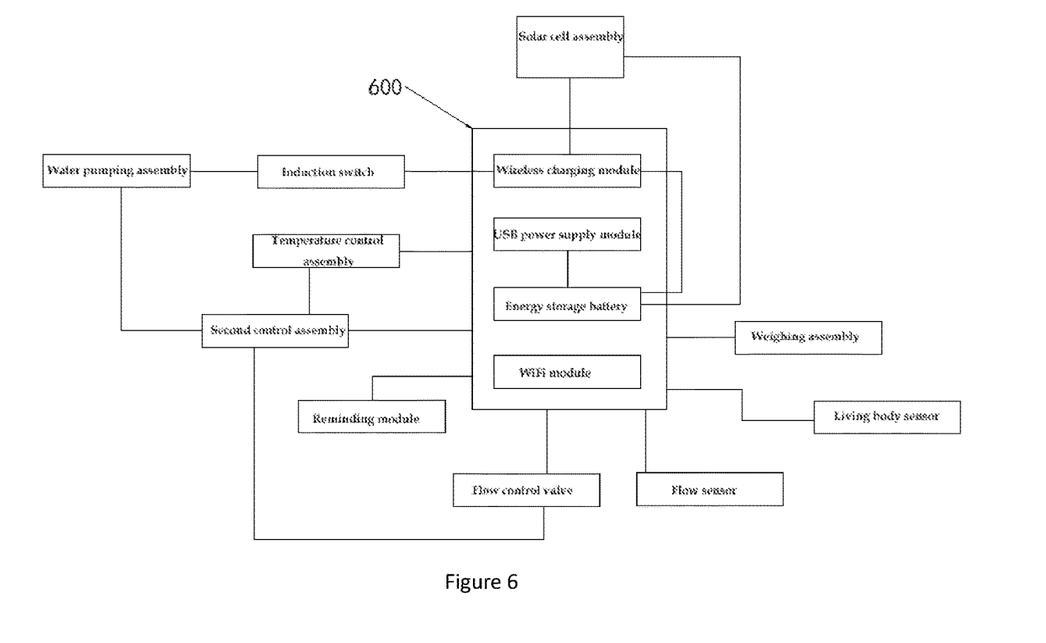
FIG. 6 is a schematic diagram of the first principle of the solar powered pet water dispenser of the present invention.
Figure 7:
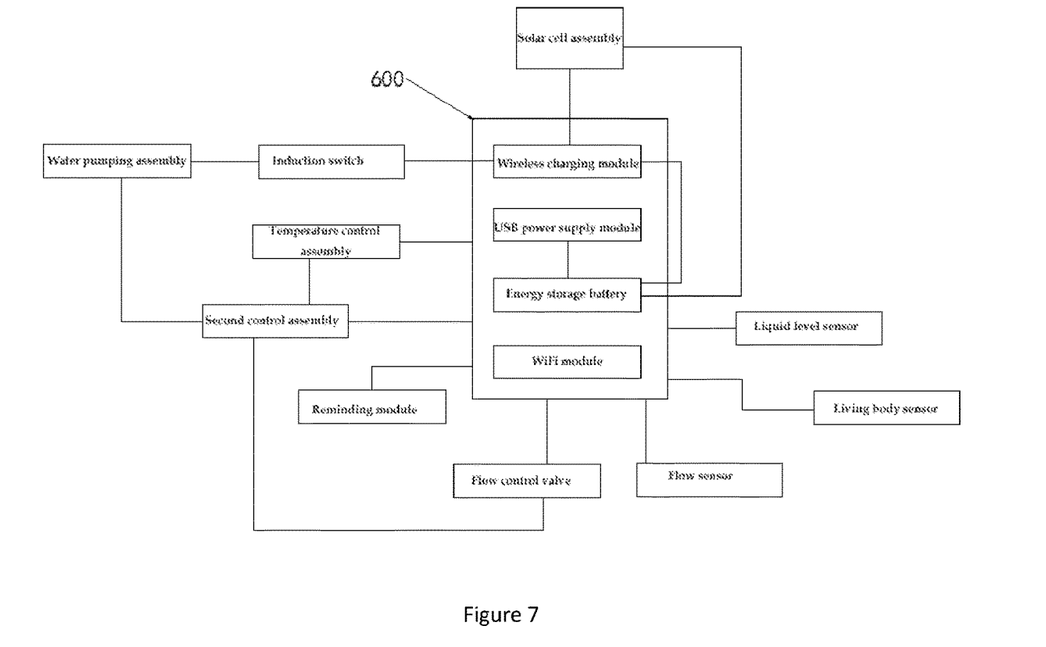
FIG. 7 is a schematic diagram of the second principle of the solar powered pet water dispenser of the present invention.

Please refer to FIG. 6 and FIG. 7, the first control assembly 600 is further provided a wireless charging module, a USB power supply module and an energy storage battery, an input end of the wireless charging module is respectively connected with output ends of both the solar cell assembly 100 and the energy storage battery, an input end of the energy storage battery is respectively connected with the solar cell assembly 100 and the USB power supply module, an output end of the wireless charging module is connected with the temperature control assembly 400, and is connected with the water pumping assembly 300 through the induction switch.

Further, the wireless charging module is provided with two output ends, a first output end of the wireless charging module which is connected to the temperature control assembly 400, and a second output end of the wireless charging module which is connected to the induction switch and the water pumping assembly 300.

Specifically, when solar energy reception of the solar cell assembly 100 is not affected, and the solar cell assembly 100 is successfully connected to the input end of the wireless charging module, the temperature control assembly 400 receives the electric energy transmitted by the wireless charging module wirelessly, and the pumping water assembly 300 receives the electric energy transmitted by the wireless charging module wirelessly through the induction switch; when the solar energy of solar cell assembly 100 receives surplus solar energy, and the solar cell assembly 100 is successfully connected to the input end of the energy storage battery, the surplus electric energy is input to the energy storage battery; when the solar energy reception of the solar cell assembly 100 is affected, the solar cell assembly 100 enters a reset state, and the output end of the energy storage battery is successfully connected with the input end of the wireless charging module to ensure normal operation of the solar powered pet water dispenser; and the USB power supply module provides electric energy to the energy storage battery so that a new power supply mode of the energy storage battery is increased and normal operation of solar powered pet water dispenser is further guaranteed.

Please refer to FIG. 6 and FIG. 7, the solar powered pet water dispenser further includes a second control assembly; the first control assembly 600 is further provided with a WiFi module, and the second control assembly communicates with the WiFi module; and the second control assembly respectively controls and is connected to the water pumping assembly 300, the temperature control assembly 400 and the induction switch through the first control assembly 600.

Specifically, the WiFi module enables the second control assembly to remotely control the solar powered pet water dispenser, which is convenient for users to remotely operate the solar powered pet water dispenser.

Please refer to FIG. 6, the solar powered pet water dispenser further comprises a weighing assembly 700 and a reminding assembly, wherein the weighing assembly 700 is arranged inside an inner wall of the water storage tank 210, and a weighing assembly 700 is connected with the first control assembly 600; the reminding assembly is communicatively connected with the first control assembly 600; the first control assembly 600 presets a default weight value and a water-added weight value, during operation, the weighing assembly 700 obtains a to-be-measured weight value of water in the water storage cavity 211, the first control assembly 600 generates a first water addition signal according to the default weight value and the to-be-measured weight value, the reminding assembly acquires the first water addition signal, and reminds the user whether to add water or not according to the first water addition signal, and the first control assembly 600 generates a second water addition weight value according to the water addition weight value and the to-be-measured weight value, the reminding assembly acquires the second water addition signal, and reminds the user whether to stop adding water according to the second water addition signal, and the first control assembly 600 communicatively connected to the temperature control assembly 400 to acquire a water evaporation amount in the water storage cavity 211, the first control assembly 600 communicates with the living body sensor 500 to obtain operation times of the water pumping assembly 300, and the first control assembly 600 obtains water consumption of pets according to the water added value, the water evaporation amount and the operation times of the water pumping assembly 300.

Specifically, the first control assembly 600 determines whether the to-be-measured weight value is less than or equal to the default weight value. If the to-be-measured weight is less than or equal to the default weight value, a first water addition signal is generated as necessary to add water, and the reminding assembly reminds the user to add water according to the first water addition signal; when the to-be-measured weight value is greater than the default weight value, a first water addition signal is generated as not necessary to add water, and the reminding assembly reminds the user not to add water according to the first water addition signal; when the to-be-measured weight value is less than the weight value of adding water, a second water addition signal is generated to continue adding water, and the reminding assembly reminds the user to continue adding water according to the second water addition signal, and when the to-be-measured weight value is equal to the water addition weight value, the second water addition signal is generated to stop adding water, and the reminding assembly reminds the user to stop adding water according to the second water addition signal. The first control assembly 600 obtains the water addition weight value, the water evaporation amount and the operation times of the water pumping assembly 300 so as to obtain the water consumption of pets, wherein water consumption=water addition weight value—to-be-measured weight value—(evaporation volume*operation times of the water pumping assembly 300), which is convenient for users to grasp drinking water condition of pets.

The solar powered pet water dispenser further comprises a liquid level sensor and a reminding assembly, wherein the liquid level sensor is arranged on a cavity wall of the water storage cavity 211 and communicatively connected to the first control assembly 600; the reminding assembly is communicatively connected to the first control assembly 600; the first control assembly 600 presets a default weight value and a water-added level value, during operation, the liquid level sensor obtains a to-be-measured water level in the water storage cavity 211, the first control assembly 600 generates a first water addition signal according to the default water level value and the to-be-measured water level value, and the reminding assembly obtains the first water addition signal, the reminding assembly reminds the user whether to add water or not according to the first addition signal, and the first control assembly 600 generates a second water addition signal according to the water addition level value and the to-be-measured water level, the reminding assembly acquires the second water addition signal, and the reminding assembly reminds the user whether to stop adding water according to the second water addition signal, and the first control assembly 600 communicates with the temperature control assembly 400 to obtain a water evaporation amount in the water storage cavity 211, and the first control assembly 600 is communicatively connected to the living body sensor 500 to obtain operation times of the water pumping assembly 300, and the first control assembly 600 obtains water consumption of pets according to the water level value, the evaporation amount and the operation times of the water pumping assembly 300.

Specifically, the first control assembly 600 determines whether the to-be-measured water level is less than or equal to the default water level. If the to-be-measured water level is less than or equal to the default water level, a first water addition signal is generated that water needs to be added, and the reminding assembly reminds the user to add water according to the first water addition signal; when the to-be-measured water level is greater than the default water level, a first water addition signal is generated that there is no need to add water, and the reminding assembly reminds the user that there is no need to add water according to the first water addition signal; when the to-be-measured water level is less than the water level to be added, a second water addition signal is generated to continue adding water, and the reminding assembly reminds the user to continue adding water according to the second water addition signal; when the to-be-measured water level is equal to the water level to be added, a second water addition signal is generated to stop adding water, and the reminding assembly reminds the user to stop adding water according to the second water addition signal; wherein water consumption=water addition weight value—to-be-measured weight value—(evaporation volume operation times of the water pumping assembly 300), which is convenient for users to grasp the drinking water situation of pets.

Please refer to the FIG. 7, the solar powered pet water dispenser further comprises a flow sensor and a flow control valve; the flow sensor is arranged inside the first water outlet 320; and the flow control valve is arranged inside the first water outlet 320, and the flow control valve is communicatively connected with the flow sensor through the first control assembly 600.

Specifically, the flow sensor obtains a water outlet velocity from the first water outlet 320 into the water holding lid 220, and then the first control assembly 600 or the second control assembly controls the flow control valve, so as to regulate the water outlet velocity from the first water outlet 320 into the water holding lid 220 and adapt to a pet drinking water speed, which avoids water coming out too slowly and pet drinking water intermittently, or avoids water coming out too fast and pet getting choked, thereby ensuring quality of drinking water for pets.

Figure 1:
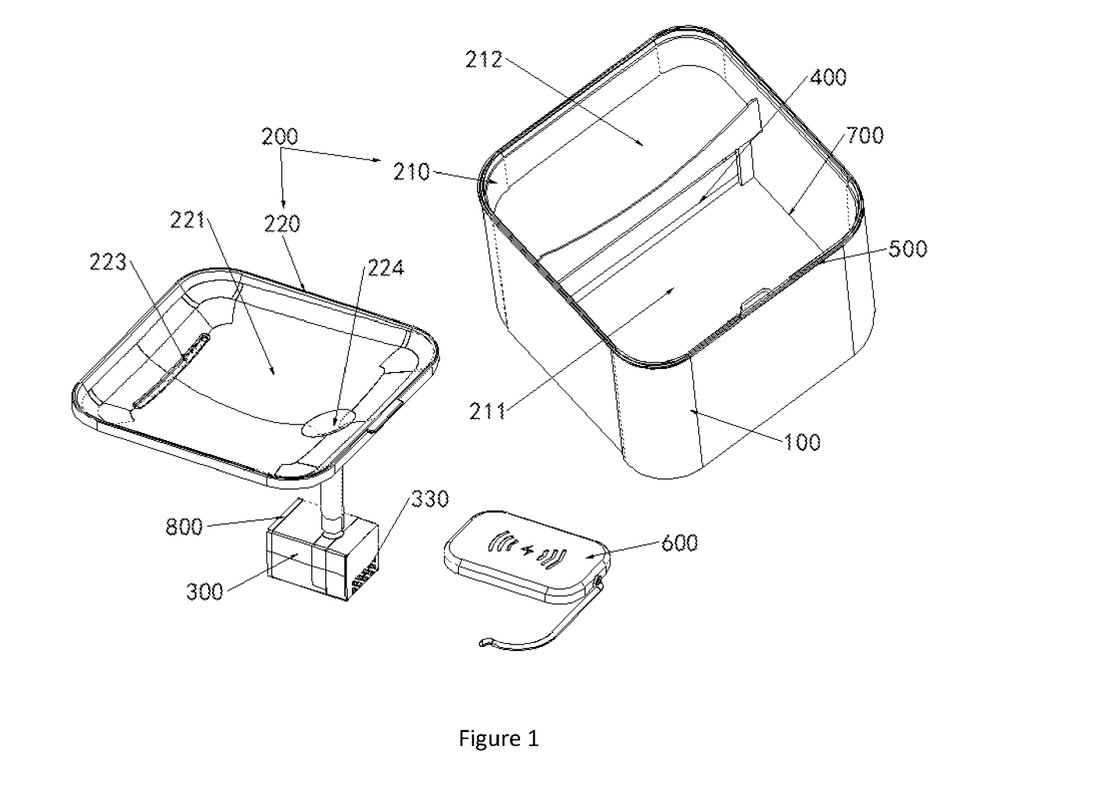
FIG. 1 is a structural decomposition diagram of the solar powered pet water dispenser of the present invention.
Figure 2:
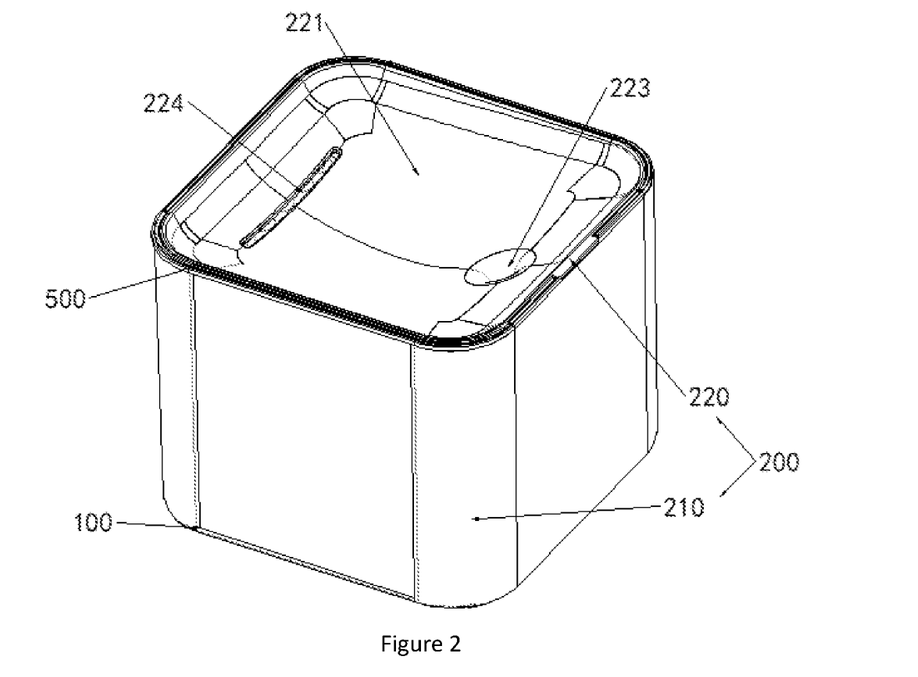
FIG. 2 is a structure diagram of the solar powered pet water dispenser of the present invention.
Figure 3:
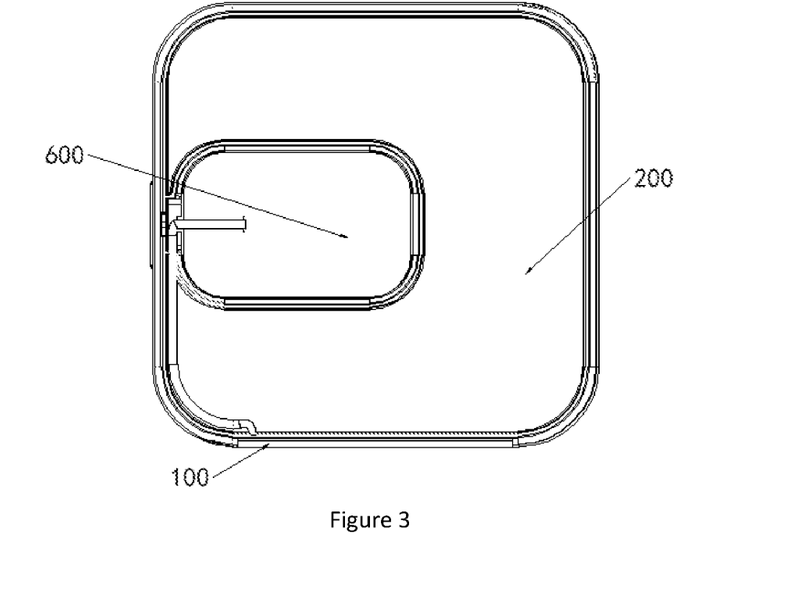
FIG. 3 is an upward view of FIG. 2.
Figure 4:
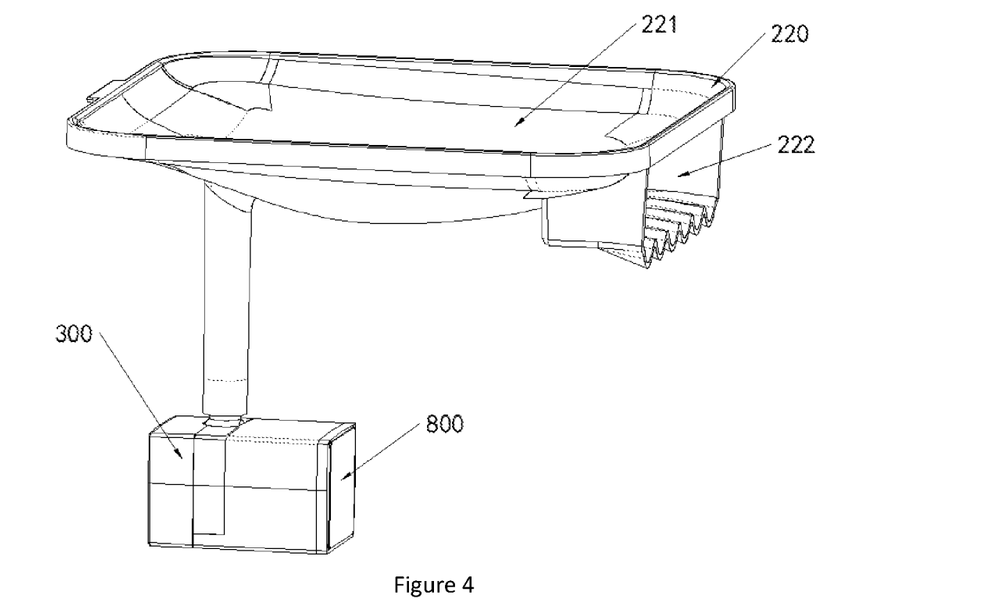
FIG. 4 is a partial decomposition diagram of FIG. 2.

Please refer to FIG. 1, FIG. 2 and FIG. 4, on a top portion of the water holding lid 220 is provided a water holding tank 221, at a bottom portion of the water holding lid 220 is provided a first filtering tank 222, and the water holding lid 220 is also provided with a second water inlet 223 and a second water outlet 224, and the water holding tank 221 is connected to a first water outlet 320 through the second water inlet 223, and the water holding tank 221 is connected to a first end of the first filtering tank 222 through the second water outlet 224, and a second end of the first filtering tank 222 is connected with the water storage cavity 211; and the first filtering tank 222 is used for storing filtering parts.

Specifically, the filtering parts in the first filtering tank 222 remove impurities from water flowing back from the water holding tank 221 to the water storage cavity 211, so as to prevent the water in the water storage cavity 211 from being polluted, thereby protecting the health of pets.

Please refer to FIG. 1, the solar powered pet water dispenser further comprises a second filtering tank 212 arranged on a cavity wall of the water storage cavity 211, a first end of the second filtering tank 212 is connected to a second end of the first filtering tank 222, a second end of the second filtering tank 212 is connected to the water storage cavity 211; and the second filtering tank 212 is used for storing parts, and filtering levels of the filtering parts stored in the first filtering tank 222 are greater than filtering levels of the filtering parts stored in the second filtering tank 212.

Specifically, the filtering parts in the first filtering tank 222 carry out simple impurity removal treatments for back flowing water from the water holding tank 221 to the water storage cavity 211, and remove particulate matters in the back flowing water; and the filtering parts in the second filtering tank 212 further remove impurities from the back flowing water from the water holding tank 221 into the water storage cavity 211, removing chlorine and metal elements in the back flowing water, so as to avoid pollution of the water in the water storage cavity 211, thereby ensuring the health of pets.

Figure 5:
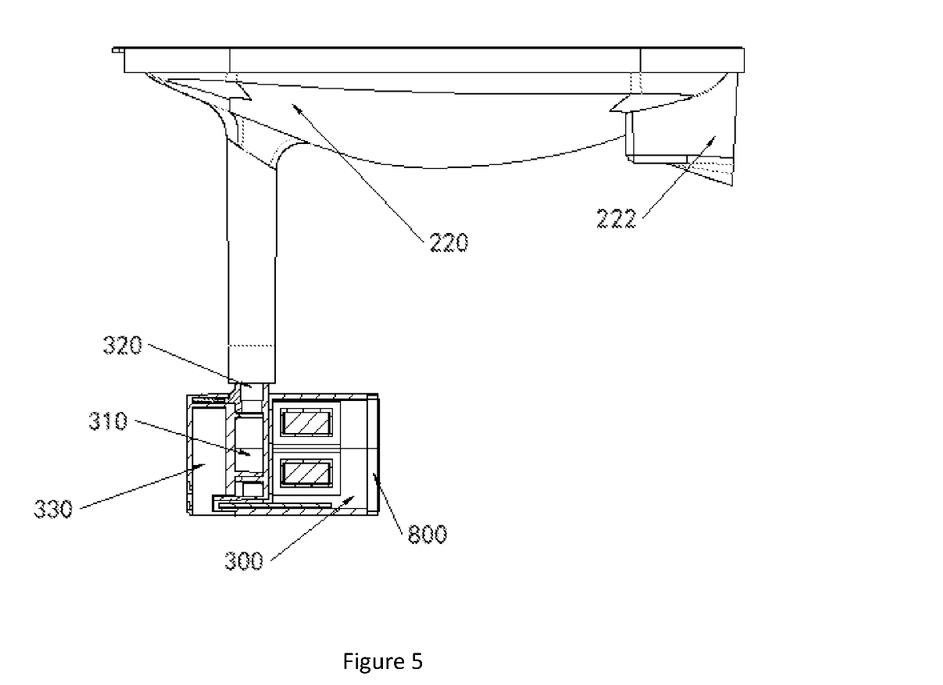
FIG. 5 is a sectional view of FIG. 2.

Please refer to FIG. 5, the water pumping assembly 300 is further provided with a third filtering tank 330, a first end of the third filtering tank 330 is connected to the water storage cavity 211 and a second end of the third filtering tank 330 is connected to the first water inlet 310; and the third filtering tank 330 is used for storing filtering parts.

Specifically, the filtering parts in the third filtering tank 330 remove impurities from the back flowing water provided from the water storage cavity 211 to the water holding lid 220, thereby further ensuring the water quality and the health of pets.

Please refer to FIG. 1, FIG. 4 and FIG. 5, the solar powered pet water dispenser further comprises a sterilization assembly 800 arranged inside the water storage cavity 211.

Specifically, the sterilization assembly 800 sterilizes water in the water storage cavity 211 to further ensure the drinking water quality for pets and ensure the health of pets.

The solar powered pet water dispenser of the present invention has following working principles: the input end of the first control assembly 600 is connected to the solar cell assembly 100, and the output end of the first control module 600 is connected to the water pumping assembly 300 and the temperature control assembly 400 respectively, so as to realize conversion from solar energy into electric energy, and provide the electric energy to the water pumping assembly 300 and the temperature control assembly 400, thereby achieving effects of energy saving and emission reduction; the temperature control assembly 400 is arranged in the water storage cavity 211, the water pumping assembly 300 is provided with the first water inlet 310 and the first water outlet 320, the first water inlet 310 is connected to the water storage cavity 211, the first water outlet 320 is connected to the water holding lid 220, the temperature control assembly 400 delivers water of an appropriate and constant temperature into the water holding cover 220, so as to avoid that pets get gastrointestinal disorders, causing dyspepsia, diarrhea and other adverse reactions when being fed too cold water or changing temperature of water frequently, or pets get scalded when drinking too hot water; the water pumping assembly 300 delivers flowing water into the water holding lid 220 to reduce breeding of bacteria and further ensure the health of pets; the living body sensor 500 is arranged on the outer wall of the water storage tank 210, the control end of the first control assembly 600 is connected to the living body sensor 500, one end of the induction switch is connected to the output end of the first control assembly 600, and another end of the induction switch is connected to the pumping water assembly 300, so that the induction switch switches into the working state according to the living body sensing signal generated by the living body sensor 500, and then controls the working state of the water pumping assembly 300; and the water pumping assembly 300 enters the working state when the pet is near, thus reducing unnecessary power losses and further realizing energy saving and emission reduction.

The above are only some preferred ways of implementation of the present invention, and do not limit the protection scope of the present invention. Any equivalent structure or equivalent process transformation made by using contents of the description and drawings of the present invention, or direct or indirect use of the present invention in other related technical fields, are similarly included in the protection scope of the present invention.

What is claimed is:

1. A solar powered pet water dispenser, comprising:
   a solar cell assembly,
   a water storage assembly, wherein the water storage assembly is provided with a water storage tank and a water holding lid hinged connected thereto, and inside the water storage tank is provided a water storage cavity,
   a water pumping assembly, wherein the water pumping assembly is provided with a first water inlet and a first water outlet, the first water inlet is connected with the water storage cavity, the first water outlet is connected with the water storage lid,
   a temperature control assembly provided inside the water storage cavity,
   a living body sensor arranged on an outer wall of the water storage tank,
   a first control assembly, wherein at an input end of the first control assembly is connected the solar cell assembly, at an output end thereof is respectively connected the water pumping assembly and the temperature control assembly, and at a control end thereof is connected the living body sensor, and
   an induction switch, wherein an end of the induction switch is connected with an output end of the first control assembly and another end thereof is connected with the water pumping assembly,
   wherein during operation, the solar cell assembly provides electrical energy to the temperature control assembly through the first control assembly, and the temperature control assembly enters a working state, the living body sensor acquires states of one or more living bodies around the water storage tank to generate living body sensing signals, and the living body sensor loads the living body sensing signals into the first control assembly, the first control assembly generates a control command according to the living body sensing signals and loads the control command into the induction switch which is then switched into a working state according to the control command, and the water pumping assembly switches into a working state according to the working state of the induction switch; and when the water pumping assembly enters a working state, water in the water storage cavity is drawn out to the water holding lid through the first water inlet and the first water outlet in sequence.

2. The solar powered pet water dispenser according to claim 1, wherein the first control assembly is further provided a wireless charging module, a USB power supply module and an energy storage battery, an input end of the wireless charging module is respectively connected with output ends of both the solar cell assembly and the energy storage battery, an input end of the energy storage battery is respectively connected with the solar cell assembly and the USB power supply module, and an output end of the wireless charging module is connected with the temperature control assembly, and is also connected with the water pumping assembly through the induction switch.

3. The solar powered pet water dispenser according to claim 2, further comprising:
   a weighing assembly arranged inside an inner wall of the water storage tank and communicating with the first control assembly,
   and a reminding assembly communicating with the first control assembly,
   wherein the first control assembly presets a default weight value and a water addition weight value, during operation, the weighing assembly obtains a to-be-measured weight value of water in the water storage cavity, the first control assembly generates a first water addition signal according to the default weight value and to-be-measured weight value, the reminding assembly acquires the first water addition signal, the reminding assembly reminds the user whether to add water or not according to the first water addition signal, and the first control assembly generates a second water addition signal according to the water addition weight value and the to-be-measured weight value, the reminding assembly acquires the second water addition signal and reminds the user whether to stop adding water according to the second water addition signal, the first control assembly is communicatively connected to the temperature control assembly to acquire a water evaporation amount in the water storage cavity, the first control assembly communicates with the living body sensor to obtain operation times of the water pumping assembly, and the first control assembly obtains water consumption of pets according to the water addition weight value, the water evaporation amount and the operation times of the water pumping assembly.

4. The solar powered pet water dispenser according to claim 2, further comprising:
a liquid level sensor arranged on a cavity wall of the water storage cavity and communicatively connected to the first control assembly, and
a reminding assembly communicatively connected to the first control assembly, wherein the first control assembly presets a default weight value and a water addition level value, during operation, the liquid level sensor obtains a to-be-measured water level in the water storage cavity, the first control assembly generates a first water addition signal according to the default water level value and the to-be-measured water level value, and the reminding assembly obtains the first water addition signal, the reminding assembly reminds the user whether to add water or not according to the first addition signal, and the first control assembly generates a second water addition signal according to the water addition level value and the to-be-measured water level, the reminding assembly acquires the second water addition signal, and the reminding assembly reminds the user whether to stop adding water according to the second water addition signal, and the first control assembly communicates with the temperature control assembly to obtain a water evaporation amount in the water storage cavity, and the first control assembly is communicatively connected to the living body sensor to obtain operation times of the water pumping assembly, and the first control assembly obtains water consumption of pets according to the water addition level value, the water evaporation amount and the operation times of the water pumping assembly.

5. The solar powered pet water dispenser according to claim 2, wherein on a top portion of the water holding lid is provided a water holding tank, at a bottom portion of the water holding lid is provided a first filtering tank, and the water holding lid is also provided with a second water inlet and a second water outlet, and the water holding tank is connected to the first water outlet through the second water inlet, and the water holding tank is connected to a first end of the first filtering tank through the second water outlet, and a second end of the first filtering tank is connected with the water storage cavity; and the first filtering tank is used for storing one or more filtering parts.

6. The solar powered pet water dispenser according to claim 2, wherein the water pumping assembly is further provided with a third filtering tank, a first end of the third filtering tank is connected to the water storage cavity and a second end of the third filtering tank is connected to the first water inlet; and the third filtering tank is used for storing one or more filtering parts.

7. The solar powered pet water dispenser according to claim 2, further comprising a sterilization assembly arranged inside the water storage cavity.

8. The solar powered pet water dispenser according to claim 1, further comprising a second control assembly, wherein the first control assembly is further provided with a WiFi module, and the second control assembly communicates with the WiFi module; and the second control assembly respectively controls and is connected to the water pumping assembly, the temperature control assembly and the induction switch through the first control assembly.

9. The solar powered pet water dispenser according to claim 8, further comprising:
a weighing assembly arranged inside an inner wall of the water storage tank and communicating with the first control assembly,
and a reminding assembly communicating with the first control assembly,
wherein the first control assembly presets a default weight value and a water addition weight value, during operation, the weighing assembly obtains a to-be-measured weight value of water in the water storage cavity, the first control assembly generates a first water addition signal according to the default weight value and to-be-measured weight value, the reminding assembly acquires the first water addition signal, the reminding assembly reminds the user whether to add water or not according to the first water addition signal, and the first control assembly generates a second water addition signal according to the water addition weight value and the to-be-measured weight value, the reminding assembly acquires the second water addition signal and reminds the user whether to stop adding water according to the second water addition signal, the first control assembly is communicatively connected to the temperature control assembly to acquire a water evaporation amount in the water storage cavity, the first control assembly communicates with the living body sensor to obtain operation times of the water pumping assembly, and the first control assembly obtains water consumption of pets according to the water addition weight value, the water evaporation amount and the operation times of the water pumping assembly.

10. The solar powered pet water dispenser according to claim 8, further comprising:
a liquid level sensor arranged on a cavity wall of the water storage cavity and communicatively connected to the first control assembly, and
a reminding assembly communicatively connected to the first control assembly, wherein the first control assembly presets a default weight value and a water addition level value, during operation, the liquid level sensor obtains a to-be-measured water level in the water storage cavity, the first control assembly generates a first water addition signal according to the default water level value and the to-be-measured water level value, and the reminding assembly obtains the first water addition signal, the reminding assembly reminds the user whether to add water or not according to the first addition signal, and the first control assembly generates a second water addition signal according to the water addition level value and the to-be-measured water level, the reminding assembly acquires the second water addition signal, and the reminding assembly reminds the user whether to stop adding water according to the second water addition signal, and the first control assembly communicates with the temperature control assembly to obtain a water evaporation amount in the water storage cavity, and the first control assembly is communicatively connected to the living body sensor to obtain operation times of the water pumping assembly, and the first control assembly obtains water consumption of pets according to the water addition level value, the water evaporation amount and the operation times of the water pumping assembly.

11. The solar powered pet water dispenser according to claim 8, wherein on a top portion of the water holding lid is provided a water holding tank, at a bottom portion of the water holding lid is provided a first filtering tank, and the water holding lid is also provided with a second water inlet and a second water outlet, and the water holding tank is connected to the first water outlet through the second water inlet, and the water holding tank is connected to a first end of the first filtering tank through the second water outlet, and a second end of the first filtering tank is connected with the water storage cavity; and the first filtering tank is used for storing one or more filtering parts.

12. The solar powered pet water dispenser according to claim 8, wherein the water pumping assembly is further provided with a third filtering tank, a first end of the third filtering tank is connected to the water storage cavity and a second end of the third filtering tank is connected to the first water inlet; and the third filtering tank is used for storing one or more filtering parts.

13. The solar powered pet water dispenser according to claim 8, further comprising a sterilization assembly arranged inside the water storage cavity.

14. The solar powered pet water dispenser according to claim 1, further comprising:
a weighing assembly arranged inside an inner wall of the water storage tank and communicating with the first control assembly,
and a reminding assembly communicating with the first control assembly,
wherein the first control assembly presets a default weight value and a water addition weight value, during operation, the weighing assembly obtains a to-be-measured weight value of water in the water storage cavity, the first control assembly generates a first water addition signal according to the default weight value and to-be-measured weight value, the reminding assembly acquires the first water addition signal, the reminding assembly reminds the user whether to add water or not according to the first water addition signal, and the first control assembly generates a second water addition signal according to the water addition weight value and the to-be-measured weight value, the reminding assembly acquires the second water addition signal and reminds the user whether to stop adding water according to the second water addition signal, the first control assembly is communicatively connected to the temperature control assembly to acquire a water evaporation amount in the water storage cavity, the first control assembly communicates with the living body sensor to obtain operation times of the water pumping assembly, and the first control assembly obtains water consumption of pets according to the water addition weight value, the water evaporation amount and the operation times of the water pumping assembly.

15. The solar powered pet water dispenser according to claim 14, further comprising:
a flow sensor arranged inside the first water outlet, and
a flow control valve arranged inside the first water outlet, wherein the flow control valve is communicatively connected with the flow sensor through the first control assembly.

16. The solar powered pet water dispenser according to claim 1, further comprising:
a liquid level sensor arranged on a cavity wall of the water storage cavity and communicatively connected to the first control assembly, and
a reminding assembly communicatively connected to the first control assembly, wherein the first control assembly presets a default weight value and a water addition level value, during operation, the liquid level sensor obtains a to-be-measured water level in the water storage cavity, the first control assembly generates a first water addition signal according to the default water level value and the to-be-measured water level value, and the reminding assembly obtains the first water addition signal, the reminding assembly reminds the user whether to add water or not according to the first addition signal, and the first control assembly generates a second water addition signal according to the water addition level value and the to-be-measured water level, the reminding assembly acquires the second water addition signal, and the reminding assembly reminds the user whether to stop adding water according to the second water addition signal, and the first control assembly communicates with the temperature control assembly to obtain a water evaporation amount in the water storage cavity, and the first control assembly is communicatively connected to the living body sensor to obtain operation times of the water pumping assembly, and the first control assembly obtains water consumption of pets according to the water addition level value, the water evaporation amount and the operation times of the water pumping assembly.

17. The solar powered pet water dispenser according to claim 1, wherein on a top portion of the water holding lid is provided a water holding tank, at a bottom portion of the water holding lid is provided a first filtering tank, and the water holding lid is also provided with a second water inlet and a second water outlet, and the water holding tank is connected to the first water outlet through the second water inlet, and the water holding tank is connected to a first end of the first filtering tank through the second water outlet, and a second end of the first filtering tank is connected with the water storage cavity; and the first filtering tank is used for storing one or more filtering parts.

18. The solar powered pet water dispenser according to claim 17, further comprising a second filtering tank arranged on a cavity wall of the water storage cavity, wherein a first end of the second filtering tank is connected to a second end of the first filtering tank, a second end of the second filtering tank is connected to the water storage cavity; and the second filtering tank is used for storing one or more filtering parts, and one or more filtering levels of the one or more filtering parts stored in the first filtering tank are greater than one or more filtering levels of the one or more filtering parts stored in the second filtering tank.

19. The solar powered pet water dispenser according to claim 1, wherein the water pumping assembly is further provided with a third filtering tank, a first end of the third filtering tank is connected to the water storage cavity and a second end of the third filtering tank is connected to the first water inlet; and the third filtering tank is used for storing one or more filtering parts.

20. The solar powered pet water dispenser according to claim 1, further comprising a sterilization assembly arranged inside the water storage cavity.

* * * * *